(12) United States Patent
Lee

(10) Patent No.: US 9,697,450 B1
(45) Date of Patent: Jul. 4, 2017

(54) MAGNETIC STRIPE DATA TRANSMISSION SYSTEM AND METHOD FOR RELIABLE DATA TRANSMISSION AND LOW POWER CONSUMPTION

(71) Applicant: Alpha and Omega Semiconductor Incorporated, Sunnyvale, CA (US)

(72) Inventor: Gilbert S. Z. Lee, Saratoga, CA (US)

(73) Assignee: ALPHA AND OMEGA SEMICONDUCTOR INCORPORATED, Sunnyvale, CA (US)

( * ) Notice: Subject to any disclaimer, the term of this patent is extended or adjusted under 35 U.S.C. 154(b) by 0 days.

(21) Appl. No.: 15/224,219

(22) Filed: Jul. 29, 2016

(51) Int. Cl.
  *G06K 7/08* (2006.01)
  *G06K 19/06* (2006.01)
  *G06K 19/073* (2006.01)

(52) U.S. Cl.
  CPC ....... *G06K 19/06206* (2013.01); *G06K 7/086* (2013.01); *G06K 19/07345* (2013.01)

(58) Field of Classification Search
  CPC .................................................... G07F 7/0873
  USPC ........................................................ 235/449
  See application file for complete search history.

(56) References Cited

U.S. PATENT DOCUMENTS 7,837,110 B1 * 11/2010 Hess ........................ G06K 7/08
              235/449
8,814,046 B1    8/2014 Wallner

OTHER PUBLICATIONS

Dan Sweet—Cypress Semiconductor Corp.; "Design How-To Building a Reliable Magnetic Card Reader (Part 1 of 2)"; EE Times—Connecting the Global Electronics Community—designlines Wireless & Networking; Jun. 14, 2010—5 pages.

* cited by examiner

Primary Examiner — Jamara Franklin
(74) Attorney, Agent, or Firm — Chen-Chi Lin

(57) ABSTRACT

A magnetic stripe data transmission (MST) driver and a method for driving the MST are disclosed. The MST driver is configured to transmit magnetic strip data comprising of streams of pulses. The MST driver comprises a pair of high side switches and a pair of low side switches. The pair of high side switches comprises a first switch and a second switch. The pair of low side switches comprises a third switch and a fourth switch. The first, second, third and fourth switches are arranged in a full bridge type configuration connected across a voltage source and a ground. An inductive coil is connected across outputs of the full bridge type configuration of the switches. The MST driver includes a switch driver configured to drive the pair of low side switches and the pair of high side switches under current slope control using pulse width modulation. The driven load current has a rising portion and a falling portion through the inductive coil in a forward direction or in a reverse direction with programmable load current rising and falling slopes to induce a recognizable back electromagnetic force at a receiver emulating the magnetic strip data during the load current rising and falling portions and to reduce power loss during time periods without signal transmission.

20 Claims, 8 Drawing Sheets

MAGNETIC STRIPE DATA TRANSMISSION SYSTEM AND METHOD FOR RELIABLE DATA TRANSMISSION AND LOW POWER CONSUMPTION

FIELD OF THE INVENTION

This invention relates generally to a system and a method for directly transmitting magnetic stripe data to ensure reliable transmission of the magnetic stripe data with low power consumption. More particularly, the present invention uses a pulse width modulation in a magnetic stripe data transmission driver. The method drives switches of the magnetic stripe data transmission driver to control current slopes of the generated signals in the magnetic stripe data transmission driver for low power, reliable data transmission.

BACKGROUND OF THE INVENTION

Magnetic stripe data transmission or magnetic security transmission (MST) is a technology that magnetic signals similar to magnetic stripe data of a traditional payment card are transmitted from a transmitter to a receiver by an MST driver. The transmitter may be a host device such as a smart-phone. The receiver may be a payment terminal's card reader. The magnetic signals emulate magnetic stripe data of the payment card that are normally read by a card reader while physically swiping the payment card on a reader head.

FIG. 1 shows a schematic representation of an inscription of payment card data on a magnetic stripe of the payment card. Waveforms corresponding to the magnetic stripe data are picked up by the payment terminal's card reader's head while swiping of the payment card along with digital equivalent of the waveforms. The MST driver emitted magnetic signals emulate the same waveforms at the payment terminal's card reader without swiping of the payment card.

In conventional magnetic stripe data transmission or magnetic security transmission (see U.S. Pat. No. 8,814,046), the MST driver is configured to transmit the magnetic strip data comprising streams of pulses. The MST driver preferably includes a full bridge type switch configuration connected across a voltage source and a ground to drive bidirectional load current through an inductive coil according to the magnetic strip data. The MST driver transmits the magnetic signal to the card reader. In the transmission of the magnetic signal, magnetic flux density of the inductive coil is varied according to the load current density, inductance value and the load current slope of the inductive coil which remotely induces a back electromagnetic force ($B_{emf}$) in a receiver of the card reader. If the back electromagnetic force ($B_{emf}$) is higher than a threshold value, the card reader then recognizes it as a High pulse. If $B_{emf}$ is lower than another threshold value, then the card reader recognizes it as a Low pulse. The High and Low pulses in combination can reconstruct the card reader's read head waveforms.

FIG. 2A shows a circuit representation of the MST driver. The MST driver comprises four MST driver switches 101, 102, 103 and 104 arranged in a full bridge type configuration connected across a voltage source and a ground $V_M$ 108. An MST coil 105 is modeled by its inductor 106 having inductance $L_1$ and series resistance $R_1$ 107. Each of the MST driver switches includes a respective body diode (D1-D4) connected across said each switch that plays a role of free-wheeling current path of stored energy in the inductor 106 during a switch off period.

The MST driver switches 101, 102, 103 and 104 are driven by an external or a built-in driving integrated circuit (IC). They have pulse shaped driving waveforms with usually 50% duty ratio of a constant frequency or a doubled frequency. In the MST driver, both the first 101 and the fourth 104 switches are simultaneously turned on for driving the load current in the MST coil 105 in a forward direction. Both the second 102 and the third 103 switches are simultaneously tuned on for driving the load current in the MST coil 105 in a reverse direction.

FIG. 2B shows an MST driver's switch driving operation and a corresponding load current waveform. The waveform can be divided into 6 time durations, T1, T2, T3, T4, T5 and T6. Time durations T1, T2 and T3 may be forward driving periods. The load current is positive during time durations T1, T2 and T3. Time durations T4, T5 and T6 may be reverse driving periods. The load current is negative during time durations T4, T5 and T6. The positive or negative value is entirely based on a designer's perspective.

In the FIG. 2B, the first 101 and the fourth 104 switches are turned on. The load current increases during T1 period. It reaches a positive peak current. In T3 period, the first 101 and the fourth 104 switches are turned off and then the second 102 and the third 103 switches are turned on. The load current starts decreasing abruptly but is still positive. It is called a reverse braking. With the second 102 and the third 103 switches in a turned-on state, the load current becomes negative in the T4 period. During T4 period, the load current slope and the absolute peak value are the same as T1 except that they are in opposite directions and are negative values. During T5 period, the negative peak current continues to flow. In T6 period, the second 102 and the third 103 switches are turned off and the first 101 and the fourth 104 switches are turned on. The load current begins to fall abruptly and has the same slope as T3 except that they are in opposite directions.

FIG. 2C shows switching cycles of the MST driver switches, the corresponding load current waveforms in the MST coil and induced back electromagnetic force ($B_{emf}$) at card reader's receiver. When the first 101 and the fourth 104 switches are driven by the same signal to turn on, the load current $I_L$ through the MST coil 105 starts to increase from previous current and reaches the peak current $I_p$. The peak current $I_p$ is dependent on a supply voltage of a voltage source $V_M$ 108 and the total series resistance $R_1$ 107 of the MST coil. It can be represented as $$\frac{V_M}{R_1}$$

if the switches' on-resistance is ignored. The load current $$\left(I_L = I_p\left(1 - 2e^{-\frac{R_1}{L_1}t}\right)\right)$$

increases exponentially with the power of $$-\frac{R_1}{L_1},$$

where $L_1$ is the inductance value of the MST coil. Similarly, if the second 102 and the third 103 switches are driven by the same signal to turn on, the load current $$\left(I_L = -I_P\left(1 - 2e^{-\frac{R_1}{L_1}t}\right)\right)$$

through the MST coil 105 starts to decreases exponentially with the power of $$-\frac{R_1}{L_1}$$

from the previous current and reaches $-I_P$.

In the FIG. 2C, a first (I) and a second (II) transient instant of the load current contribute to the magnetic signal transmission, since the induced $B_{emf}$ reaches its peak value during transient variation of the load current depending on the load current slope in the $B_{emf}$ waveform of FIG. 2C. The steady state periods of load current fixed to $+I_p$ or $-I_p$ have no contribution to induce $B_{emf}$. If the induced $B_{emf}$ generates a voltage signal higher than a positive threshold voltage $V_r$, on the receiver in the card reader, the card reader recognizes it as "High". If the induced $B_{emf}$ generates a voltage signal lower than a negative threshold voltage $-V_r$, the card reader recognizes it as "Low".

The back electromagnetic force ($B_{emf}$) depends on the magnetic flux density change ratio which follows current density change ratio in the inductive coil. The current density change ratio to time is basically the load current slope which is inversely proportional to the inductive coil's inductance value. In a fast current slope, the induced $B_{emf}$ is big. In a slow current slope, the induced $B_{emf}$ is small. In a fast current slope, if the corresponding duration is too short the receiver in the card reader may not recognize the signal. In a fast current slope with long duration, a peak inductive current increases. It may exceed current rating of the MST driver. It causes additional power loss by high current. The high current slope has side effect, for example, noise and Electromagnetic Interference (EMI) issues.

Optimization and control of the load current slope and time duration are important in the MST driving technology so as to ensure reliable signal transmission while consuming less power. However, in the conventional MST driver, the load current slope cannot be controlled except changing parameters including coil's inductance, series resistance of the coil or on-resistance of the full bridge driver's switches. It may not be easy to control those parameters because limiting factors have trade-offs in performance, cost and form factor. One way is to increase the inductance of the MST coil, but bigger inductance requires larger size and increased cost. Therefore, prior art MST driver cannot deliver. The prior art MST driver has low energy efficiency due to limited inductance. It requires long duration to achieve good transmission quality. It may lose signal because of increased efficiency.

The performance of the prior art MST driver is affected by the power supply voltage and the MST coil because it is difficult to control or adjust them. In term of efficiency, the prior art method consumes a lot of power even during time periods without signal transmission. The signal transmission is done only in the transient period of the load current. The steady state of the peak current consumes power without conducting work. It is much longer than the transient time. Energy efficiency is much worse. It has a big impact on a power supply system.

It has a need to develop a new MST driver that can program or control the load current slope value and time durations to ensure reliable signal transmission with less power consumption.

SUMMARY OF THE INVENTION

In examples of the present disclosure, a magnetic stripe data transmission (MST) driver is disclosed. The advantages of the MST driver includes low power consumption and reliable transmission of magnetic signals.

An MST driver is configured to transmit magnetic strip data including streams of pulses. The MST driver includes a pair of high side switches and a pair of low side switches. The pair of high side switches comprises a first switch and a second switch. The pair of low side switches comprises a third switch and a fourth switch. The first, second, third and fourth switches are arranged in a full bridge type configuration connected across a voltage source and a ground. An inductive coil connects across outputs of the full bridge type configuration of the switches.

A switch driver is configured for driving the pair of low side switches and the pair of high side switches under current slope control using pulse width modulation for inducing recognizable back electromagnetic force at a receiver. It emulates the magnetic strip data during load current rising and falling portions through the inductive coil.

In examples of the present disclosure, a switch driver of the MST driver is configured to drive the pair of low side switches or the pair of high side switches by selectively and repeatedly switching between an ON state and an OFF state. It drives the load current including a rising portion and a falling portion through the inductive coil in a forward direction or in a reverse direction with programmable load current rising and falling slopes to generate magnetic signal for inducing the recognizable back electromagnetic force at the receiver. It emulates the magnetic strip data during the load current rising and falling portions and reduces power loss during time periods without signal transmission.

In examples of the present disclosure, a switch driver of the MST driver includes pulse width modulator configured to generate a first pulse width modulation (PWM) control signal for reliable data transmission and a second PWM control signal for power loss reduction.

In examples of the present disclosure, a switch driver of the MST driver is configured to drive the pair of low side switches to control the load current so as to have the rising portion and the falling portion through the inductive coil in a forward direction with the first switch in a continuously ON state and repeatedly switching the fourth switch between an ON state and an OFF state according to the first PWM control signal and then the second PWM control signal.

In examples of the present disclosure, a switch driver of the MST driver is configured to drive the pair of low side switches to control the load current so as to have the rising portion and the falling portion through the inductive coil in a reverse direction with the second switch in a continuously ON state and repeatedly switching the third switch between an ON state and an OFF state according to the first PWM control signal and then the second PWM control signal.

In examples of the present disclosure, a switch driver of the MST driver is configured to drive the fourth switch by repeatedly switching between an ON state and an OFF state according to duty cycles of the first PWM control signal and the second PWM control signal. The duty cycle of the first PWM control signal is adjusted to set a rising portion of the forward load current to a current limit in a positive first slope to induce a negative back electromagnetic force lower than a negative reference voltage in the receiver and to recognize the induced back electromagnetic force corresponding to a low pulse signal. The duty cycle of the second PWM control signal is adjusted to set a falling portion of the forward load current after reaching the current limit in a second slope opposite to the positive first slope and slower than the positive first slope value to induce a positive back electromagnetic force lower than a positive reference voltage in the receiver, which can be ignored, to reduce the power loss during the time periods without signal transmission.

In examples of the present disclosure, a switch driver of the MST driver is configured to drive the third switch by repeatedly switching between an ON and an OFF state according to the duty cycles of the first PWM control signal and the second PWM control signal. The duty cycle of the first PWM control signal is adjusted to set a falling portion of the reverse load current to the current limit in a negative first slope to induce a positive back electromagnetic force higher than the positive reference voltage in the receiver to recognize the induced back electromagnetic force corresponding to a high pulse signal. The duty cycle of the second PWM control signal is adjusted to control a rising portion of the reverse load current after reaching to the current limit in a positive second slope slower than the first slope to induce a negative back electromagnetic force higher than the negative reference voltage in the receiver, which can be ignored, to reduce the power loss during the time periods without signal transmission.

In examples of the present disclosure, a method for driving the MST driver is disclosed. The advantages of the method includes low power consumption and reliable transmission of the MST driver emitted signals. An MST driver is configured to transmit magnetic strip data comprising of streams of pulses. The MST driver comprises a pair of high side switches comprising a first switch and a second switch; and a pair of low side switches comprising a third switch and a fourth switch. The first, second, third and fourth switches are arranged in a full bridge type configuration connected across a voltage source and a ground. An inductive coil connects across outputs of the full bridge type configuration of the switches. The method generates magnetic signal by driving load current having a rising portion and a falling portion through the inductive coil in a forward direction or in a reverse direction with programmable load current rising and falling slopes to induce recognizable back electromagnetic force at a receiver. It emulates the magnetic strip data during the load current rising and falling portions and reduces power loss during time periods without signal transmission by controlling current slopes including pulse width modulation (PWM).

In examples of the present disclosure, the method includes providing diodes connected across each of the first, second, third and fourth switches to facilitate free-wheeling of the current corresponding to stored energy in the inductor coil during an OFF period of the switches.

In examples of the present disclosure, the driving of the load current through the inductive coil with the programmable load current rising and falling slopes includes selectively and repeatedly switching the pair of low side switches or the pair of high side switches.

In examples of the present disclosure, the driving of the load current through the inductive coil with programmable load current rising and falling slopes by selectively and repeatedly switching the pair of low side switches comprises turning the first switch in a continuously ON state and repeatedly switching the fourth switch between an ON state and an OFF state to drive the load current in the forward direction with programmable load current rising and falling slopes. It further comprises turning the second switch in a continuously ON state and repeatedly switching the third switch between an ON state and an OFF state to drive the load current in the reverse direction with programmable load current rising and falling slopes.

In examples of the present disclosure, the driving of the load current through the inductive coil with programmable load current rising and falling slopes by selectively and repeatedly switching the pair of high side switches comprises turning the fourth switch in a continuously ON state and repeatedly switching the first switch between an ON state and an OFF state to drive the load current in the forward direction with programmable load current rising and falling slopes. It further comprises turning the third switch in a continuously ON state and repeatedly switching the second switch between an ON state and an OFF state for driving the load current in reverse direction with programmable load current rising and falling slope.

In examples of the present disclosure, the method further comprises driving of the load current in forward direction with programmable load current rising and falling slopes including repeatedly switching the switches between an ON state and an OFF state according to duty cycles of a first PWM control signal and a second PWM control signal. It adjusts the duty cycle of the first PWM control signal to set a rising portion of the forward load current to a current limit in a positive first slope to induce a negative back electromagnetic force lower than a negative reference voltage in the receiver to recognize the induced back electromagnetic force corresponding to a low pulse signal. It adjusts the duty cycle of the second PWM control signal to set a falling portion of the forward load current after reaching to the current limit in a second slope opposite to the positive first slope and slower than the first slope value to induce a positive back electromagnetic force lower than a positive reference voltage in the receiver, which can be ignored, to reduce the power loss during time periods without signal transmission.

In examples of the present disclosure, the method comprises the driving of the load current in the reverse direction with programmable load current rising and falling slopes includes repeatedly switching the switch between an ON state and an OFF state according to duty cycles of the first PWM control signal and the second PWM control signal. It adjusts the duty cycle of the first PWM control signal to set a falling portion of the reverse load current to the current limit in negative first slope to induce a positive back electromagnetic force higher than the positive reference voltage in the receiver to recognize the induced back electromagnetic force corresponding to a high pulse. It adjusts the duty cycle of the second PWM control signal to control a rising portion of the reverse load current after reaching the current limit in a positive second slope slower than the first slope to induce a negative back electromagnetic force higher than the negative reference voltage in the receiver, which can be ignored, to reduce the power loss during the time periods without signal transmission.

In examples of the present disclosure, the positive first slope is selectively attained to provide load current rising time duration sufficient to recognize the induced back electromagnetic force signal in the receiver as a low pulse signal.

In examples of the present disclosure, the negative first slope is selectively attained to provide load current falling time duration sufficient to recognize the induced back electromagnetic force signal in the receiver as a high pulse signal.

In examples of the present disclosure, the driving of the load current through the inductive coil with programmable load current rising and falling slopes includes an intermediate stage between forward and reverse current driving. The load current in the intermediate stage reduces to zero for better power efficiency.

In examples of the present disclosure, linearity of the load current rising and falling slopes is controlled by changing the duty cycle of PWM control signal. For linear slope, the PWM duty cycle is varied. For non-linear logarithmic slope, the PWM duty cycle is a constant.

In examples of the present disclosure, PWM switching frequency during the rising and falling current slope intervals is much faster than the input signal frequency to reduce current ripple in the load current.

In examples of the present disclosure, the method may include pulse frequency modulation (PFM) method including constant on-time control and constant off-time control to control the load current slopes.

DETAILED DESCRIPTION OF THE INVENTION

An MST driver and a method for driving the MST driver are disclosed. It is for low power, reliable transmission of emitted signals of the MST driver by controlling the current slope of the emitted signals using pulse width modulation (PWM) technique. The MST driver is configured to transmit magnetic strip data including streams of high or low pulses. The MST driver comprises a pair of high side switches including a first switch and a second switch and a pair of low side switches including a third switch and a fourth switch. The switches are arranged in a full bridge type configuration connected across a voltage source and a ground. An inductive coil is connected across outputs of the full bridge type configuration of the switches.

The MST driver further comprises a switch driver that is configured to drive the pair of low side switches and the high side switches under current slope control using PWM. It is for inducing recognizable back electromagnetic force ($B_{emf}$) at receiver end and for emulating the magnetic strip data during load current rising and falling portions through the inductive coil.

The induced back electromagnetic force $B_{emf}$ is a time derivative of the load current through the inductive coil. The induced $B_{emf}$ is a negative value to the load current. The induced $B_{emf}$ is calculated by:

$$B_{emf} = -L_1 \frac{di}{dt}$$

where, $L_1$ is the inductance value of the inductive coil and $$\frac{di}{dt}$$

is the time derivative of the load current through the inductive coil.

$$\frac{di}{dt}$$

corresponds to the load current slope.

The switch driver of the MST driver includes a pulse width modulator configured to generate a first pulse width modulation control signal (PWM 1) and a second pulse width modulation control signal (PWM 2). The switch driver drives either the pair of the low side switches or the pair of the high side switches by selectively and repeatedly switching between ON state and OFF state. It is to drive load current involving a rising portion and a falling portion through the inductive coil either in forward or in reverse direction with programmable load current rising and falling slope to generate a magnetic signal. It is for inducing the recognizable back electromagnetic force at the receiver end and for emulating the magnetic strip data during the load current rising and falling portion.

A method using PWM controls on-time or off-time of the driver switches to change the average current in the inductive load of the MST driver. The controlling of the on-time or the off-time of the MST driver switches enables the method to program the current slope according to application requirement. The method can transmit the signal more reliably and efficiently. The method illustrates how to control or program the current slope stably through the PWM control even in a condition with different power supply voltage and MST coil.

Figure 1:
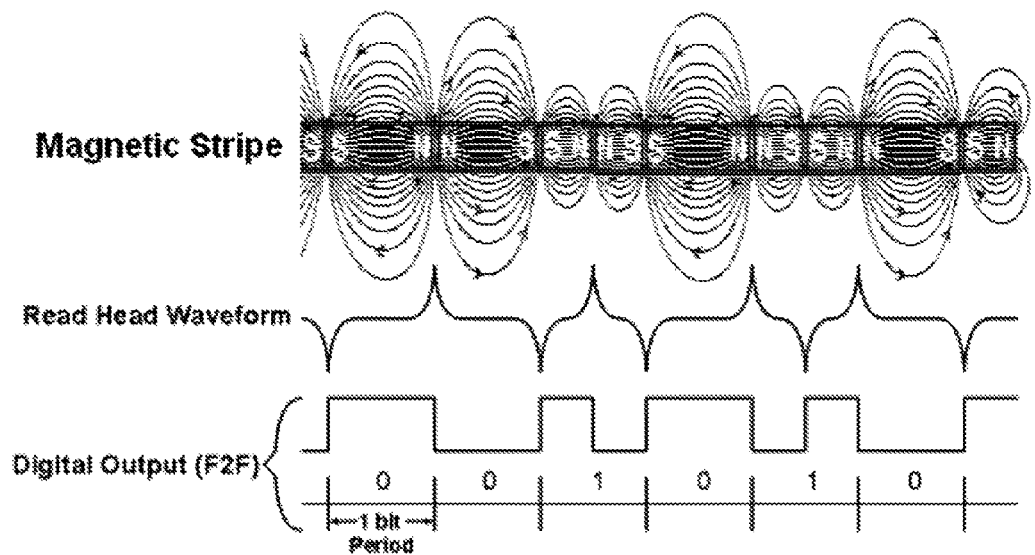
FIG. 1 shows an inscription of payment card data on a magnetic stripe of the payment card and a waveform corresponding to the magnetic stripe data as picked up by the payment terminal's card reader while swiping of the payment card along with a digital equivalent of the waveform.
Figure 2A:
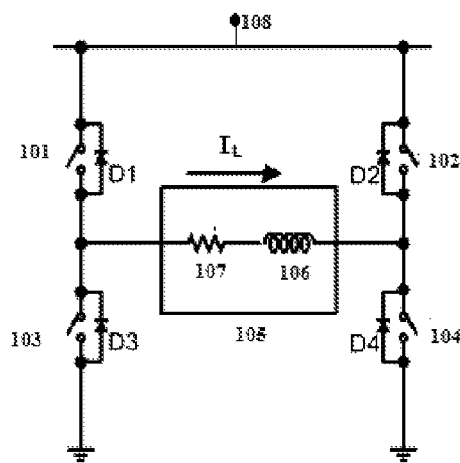
FIG. 2A shows a circuit representation of the MST driver.
Figure 2B:
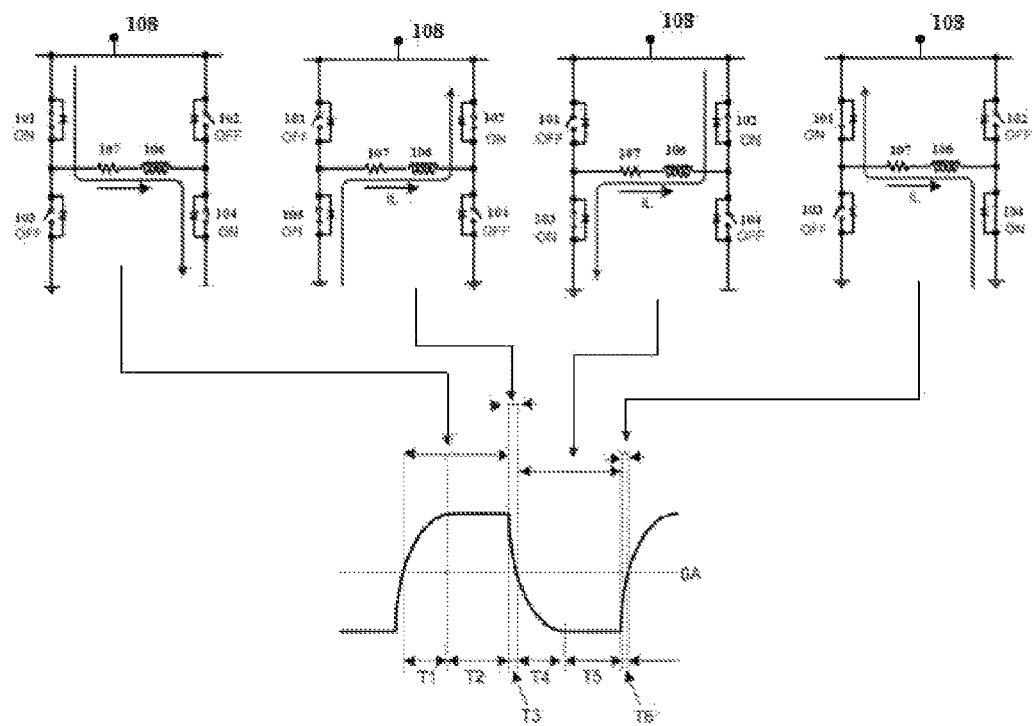
FIG. 2B shows an operation of the conventional MST driver switches and corresponding load current waveforms in an inductive coil of the MST driver.
Figure 2C:
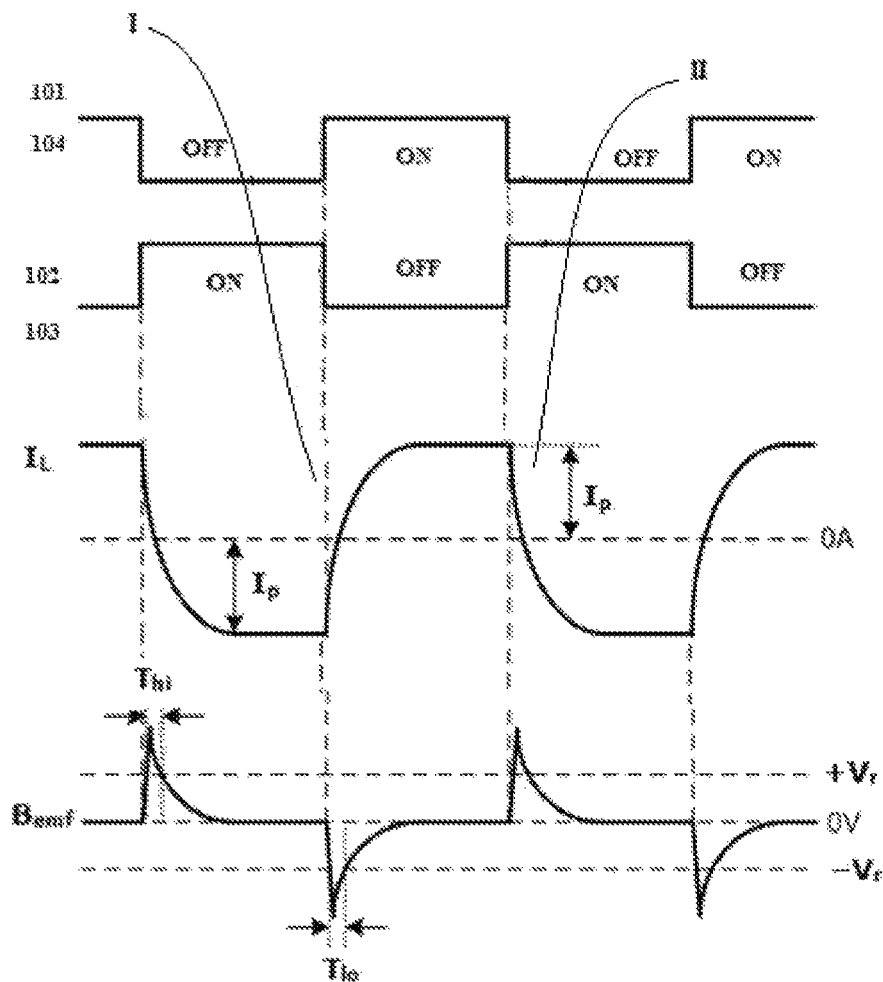
FIG. 2C shows switching cycles of the MST driver switches, corresponding load current waveform in the MST coil and an induced back electromagnetic force ($B_{emf}$) at card reader's receiver.
Figure 3:
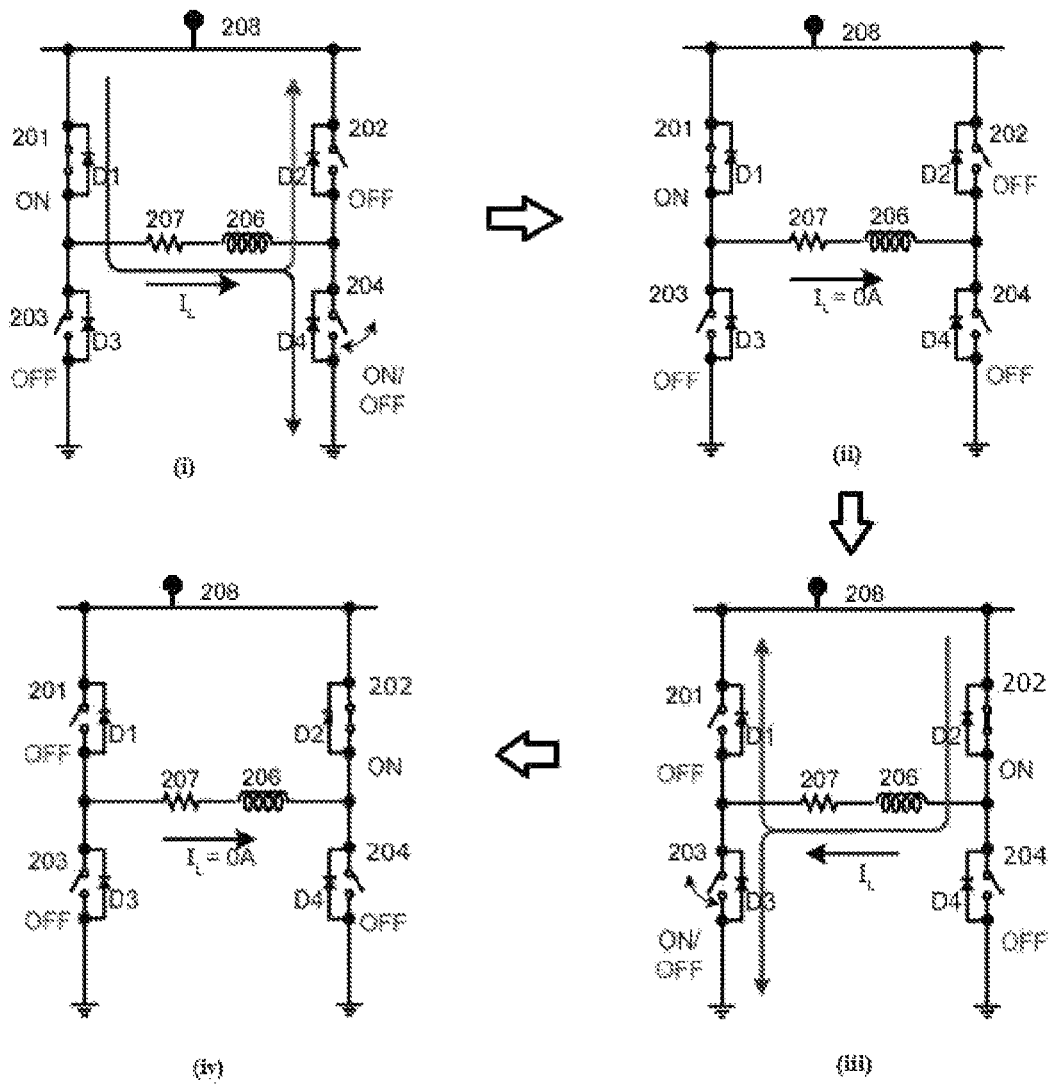
FIG. 3 [from (i) to (iv)] shows an MST driver's switch driving mechanism in a full bridge type switch configuration of an MST driver in examples of the present disclosure.

FIG. 3 shows an MST switch driving mechanism in a full bridge type switch configuration of an MST driver in examples of the present disclosure. The MST driver comprises a pair of high side switches 201, 202 and a pair of low side switches 203, 204 arranged in a full bridge type configuration connected across a voltage source $V_M$ 208 and a ground and an inductive MST coil 206 having inductance $L_1$ and series resistance $R_1$ 207. Each of the MST driver switches includes a respective diode (D1-D4) connected across the switch 201, 202, 203, 204. It plays a role of free-wheeling current path of stored energy in the inductive MST coil 206 during the switch off period. In examples of the present disclosure, the full bridge type switch configuration of the MST driver comprises a first and a second high side low side metal-oxide semiconductor field-effect transistor (MOSFET) pairs connected in parallel between the voltage source and the ground. Each high side low side MOSFET pair comprises a high side MOSFET and a low side MOSFET connected in series with the drain of the high side MOSFET connected to the voltage source and the source of the low side MOSFET connected to ground, and the inductive MST coil 206 and the series resistance $R_1$ 207 connected between the common (outputs) nodes of the two high side low side MOSFET pairs.

The MST switch driving method as shown in FIGS. 3(i)-(iv) discloses the driving of the load current involving a rising portion and a falling portion through the inductive coil in a forward and in a reverse direction with a programmable load current rising and falling slope by selectively and repeatedly switching the pair of the low side switches 203, 204 of the MST driver. Each switch is driven by a separate driving signal different from each other.

In the MST driver, for driving the load current in the MST coil in the forward direction the first switch 201 are continuously turned ON and the fourth switch 204 repeatedly switches between ON and OFF state. For driving the load current in the MST coil in the reverse direction, the second switch 202 are continuously turned ON and the third switch 203 repeatedly switches between ON and OFF state according to duty cycles of PWM control signals.

Figure 4:
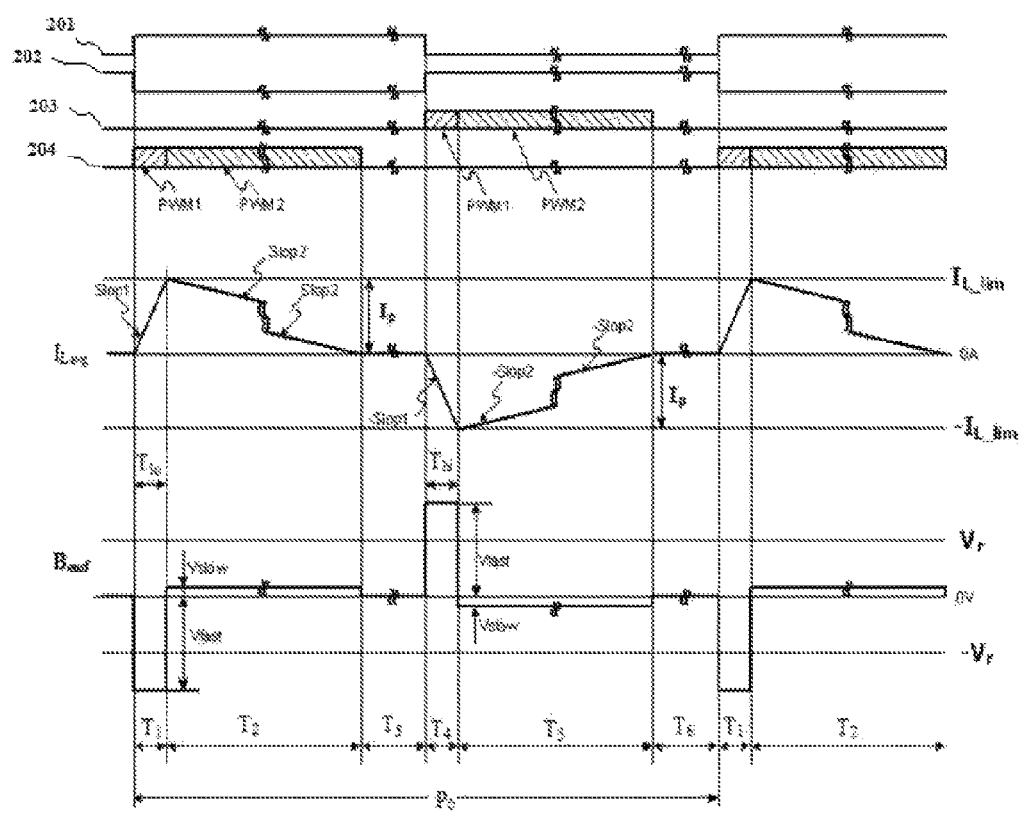
FIG. 4 shows the MST driver's switching operation with the load current waveform and the induced back electromagnetic force at the receiver in examples of the present disclosure.

FIG. 4 shows MST driver's switching operation with the load current waveform and the induced back electromagnetic force at the receiver end in examples of the present disclosure. The waveforms have a same period $P_0$ divided into 6 time intervals $T_1$, $T_2$, $T_3$, $T_4$, $T_5$ and $T_6$. The time intervals $T_1$ and $T_2$ are corresponding to "forward switching". The time intervals $T_4$ and $T_5$ are corresponding to "reverse switching". First current slope (Slop1) during the time interval $T_1$ and $T_4$ is much faster than second current slope (Slop2) during the time interval $T_2$ and $T_5$.

Referring now to FIG. 3(i) and FIG. 4, during $T_1$ time interval, the first switch 201 is turned ON and the fourth switch 204 repeatedly switched between ON and OFF states based on a duty cycle of the first PWM control signal PWM 1. The other two switches 202, 203 stay in OFF state. During the $T_1$ interval, the load current ($I_L$) increases by using PWM1 method to a current limit $I_{L\_lim}$ which limits the excessive load current.

The PWM1 makes the fourth switch 204 repeatedly switched between ON and OFF state based on duty cycle (on-time/period). The duty cycle increases to maximize current when it is close to $I_{L\_lim}$. The PWM1 controls rising of the forward load current to a current limit in a first positive slope Slop1. The Slop1 value is determined to ensure the induced negative back electromagnetic force ($-V_{fast}$) is lower than negative reference voltage ($-V_r$) in the receiver end. Therefore, the receiver can recognize the induced back electromagnetic force corresponding to a low pulse signal.

Another factor for successful transmission is that the Slop1 duration time $T_{lo}$ should be long enough to recognize the induced back electromagnetic force in the card reader. In the MST driver, the Slop1 is controlled by setting the duty cycle of the PWM1. The instant load current during PWM control signal has a small saw-tooth waveform ripple. But, the load current $I_L$ waveform in FIG. 4 shows the average value of the load current during PWM.

When the load current reaches the $I_{L\_lim}$ during $T_1$ time interval, it begins to decrease and has a second current slope (Slop2) controlled by second PWM control signal PWM2 during the $T_2$ interval. In the $T_2$ interval as shown in FIG. 3(ii) and FIG. 4, the fourth switch 204 still switches between ON and OFF state but its duty cycle is different from $T_1$. The PWM2 makes the second slope (Slop2) opposite to the Slop1 and much slower than Slop1 value. Therefore, the induced positive back electromagnetic force ($V_{slow}$) becomes much lower than the positive reference voltage ($V_r$) in the receiver end and is ignored by the receiver. This operation reduces the power loss drastically comparing to the prior art. In conventional operation, the load current is fixed to a constant value for the $T_2$ interval and consumes lots of power loss (Iout*VM) without conducting work.

The Slop2 and the end current level are dependent on the coil inductance value ($L_1$), the peak current level ($I_{L\_lim}$), the period ($P_0$), and card reader's receiver reference voltage level ($V_r$). The end current level may or may not reach zero level. The Slop2 can be controlled by setting the duty cycle of the PWM2.

If the load current is decayed completely before the $T_3$ interval of FIG. 3(ii), during the $T_3$ interval, the load current is zero and the fourth switch 204 as well as the second switch 202 and the third switch 203 are turned off. The first switch 201 may be on or off. If the load current in the $T_3$ interval doesn't exist and is skipped, the $T_4$ interval starts after $T_2$ interval. The longer the $T_3$ time, the better the power efficiency.

The $T_4$ interval as shown in FIG. 3(iii) and FIG. 4 is the same as the $T_1$ interval except that the load current directions are in opposite directions. In the $T_4$ interval, the first switch 201 and the fourth switch 204 are turned off. The second switch 202 is turned on continuously. The third switch 203 is switched between ON and OFF state according to the PWM1. In the $T_4$ interval, the first slope Slop1 is negative and the induced back electromagnetic force is positive. The induced positive back electromagnetic force ($+V_{fast}$) should be higher than $V_r$ and the time ($T_{hi}$) should be long enough, so that the receiver can identify the high pulse signal.

The $T_5$ interval of FIG. 3(iii) and FIG. 4 is the same as the $T_2$ interval except that the load current directions are in opposite directions. During the $T_5$ interval, the first switch 201 and the fourth switch 204 are turned off continuously. The second switch 202 is turned ON. The third switch 203 is switched between ON and OFF state according to the PWM2. The second slope, Slop2, is positive and the induced back electromagnetic force ($-V_{slow}$) is negative comparing to that in the $T_4$ interval and is higher than $-V_r$, which can be ignored at the receiver end. In examples of the present disclosure, all the operations of $T_5$ are the same as $T_2$ except that their directions are opposite.

The $T_6$ interval of FIG. 3(iv) and FIG. 4 is the same as the $T_3$ interval.

In the MST driver's switch driving operation as described above, when the first 201 and the fourth 204 switches or the second 202 and the third 203 switches are turned on, the load current $I_L$ level increases for switch on time ($t_{on}$) period by Eq. 1 and Eq. 2.

$$\frac{\Delta I_{L\_on}}{t_{on}} = \frac{V_M - V_{drop1}}{L_1} \qquad \text{Eq. 1}$$

$$V_{drop1} = I_L * (R_1 + R_{on1,2} + R_{on4,3}) \qquad \text{Eq. 2}$$

where $V_M$ is the power supply voltage. $L_1$ is the inductance value of the MST coil. $R_1$ is the series resistance of the coil. $R_{on1,2}$ is the on-resistance of the first switch 201 or the second switch 202 in the high side. $R_{on4,3}$ is the on-resistance of the fourth switch 204 or the third switch 203 in the low side.

When the first 201 or the second 202 switch is turned on and the fourth 204 and the third 203 switches are turned off, the $I_L$ current decreases for switch off time ($t_{off}$) period by Eq. 3 and Eq. 4. This period is called as a freewheeling.

$$\frac{\Delta I_{L\_off}}{t_{off}} = \frac{V_{F2,1} - V_{drop2}}{L_1} \qquad \text{Eq. 3}$$

$$V_{amp2} = I_L * (R_1 + R_{on1,2} + R_{on2,1}) \qquad \text{Eq. 4}$$

where $V_{F2,1}$ is the forward voltage of D2 or D1 and $R_{on2,1}$ is the on-resistance of the second 202 or the first 201 switch in the high side.

Figure 5A:
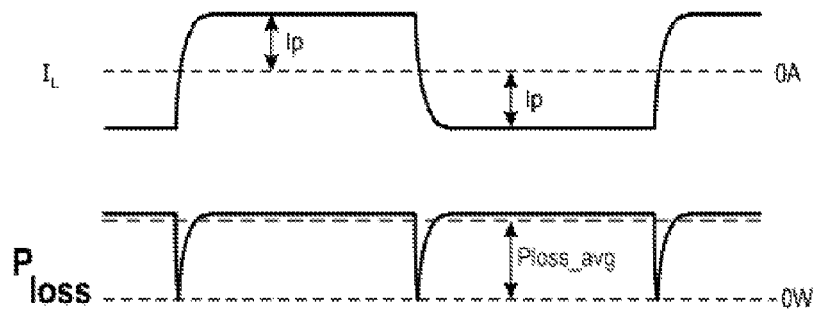
FIGS. 5a and 5b show comparison of power consumption in the prior art MST driver and the disclosed MST driver.

FIG. 5a shows a power loss reduction of the MST driver. In a prior art method, the steady state of the load current consumes a lot of power without conducting work because the signal transmission happens during the transient period of the load current. Therefore, the longer period $P_0$ is, the bigger power loss is consumed and the higher temperature is reached. In a battery system, it will make the battery re-charge more frequently.

Figure 5B:
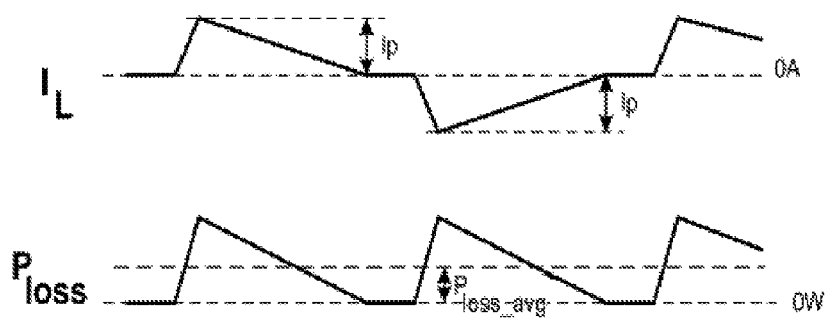

In FIG. 5b, the load current is decaying during the $T_2$ and $T_5$ intervals of FIG. 4 and can reach zero level. Therefore, if $T_3$ and $T_6$ intervals are long, the average power loss, $P_{loss\_avg}$, becomes at least lower than a half of that in the conventional MST driver.

In the prior art method, the slope changing quickly in the beginning stage of transition is out of control due to the freewheeling operation and the high voltage ($V_M$+2VBE) applied to the inductor. It generates lots of high frequency noise including EMI which can cause many side effects. However, since the disclosed MST driver can control the current slope, optimal condition between the performance and the noise can be achieved.

The MST drive includes the linear and non-linear (logarithmic) rising and falling in the load current using PWM. According to the PWM duty cycle the current slope can be controlled to be linear or non-linear. The rising and falling current slopes of FIG. 4 are linear. For the linear slope, the PWM duty cycle is varying. However, if the PWM duty cycle is constant, the rising and falling current slopes becomes non-linear (logarithmic).

The PWM switching frequency during the fast/slow rising/falling current slope intervals, $T_1$, $T_2$, $T_4$ and $T_5$, is set much faster than the input signal frequency, $1/P_0$, to minimize current ripple in the load current.

The absolute value of |Slop1| and |Slop2| are determined by $V_r$, $-V_r$, $T_{hi}$, and $T_{lo}$ for successful signal transmission. |Slop1| is designed for $B_{emf}$ to induce the receiver to generate a voltage signal higher than $V_r$. |Slop2| is adjusted for $B_{emf}$ to induce the receiver to generate a voltage signal lower than $V_r$ that can be ignored. |Slop1| is much higher than |Slop2| with reference to $V_r$ and $-V_r$. The control purpose of the |Slop1| is for more successful data transmission and the |Slop2| is for power loss reduction.

Figure 6:
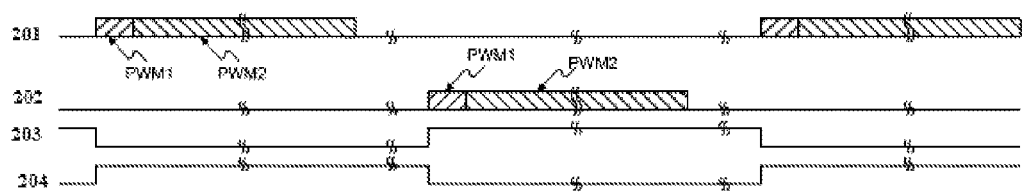
FIG. 6 shows PWM switching of the high side switches 201, 202 comparing to the low side PWM switches in FIG. 4.

FIG. 6 shows the PWM switching of the high side switches 201, 202 (to be compared with the low side PWM switching of FIG. 4). It shows almost same result as the low side PWM switching.

The PWM method of the present disclosure can be replaced by a pulse frequency modulation (PFM) method including constant on-time control and constant off-time control. In examples of the present disclosure, the load current slope can be controlled by the PFM method instead of PWM method to get similar waveforms of FIG. 4.

Figure 7:
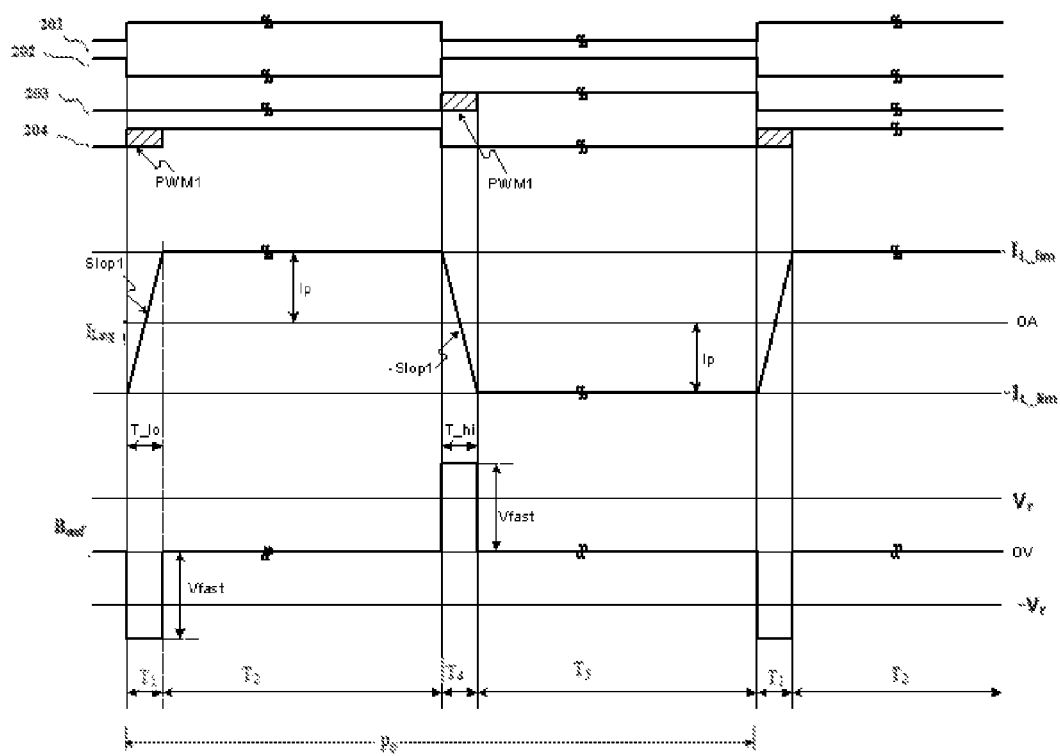
FIG. 7 shows the MST driver's switching operation with the load current waveform and the induced back electromagnetic force at the receiver including PWM in the rising current slope only in examples of the present disclosure.

FIG. 7 shows the MST driver's switching operation with the load current waveform and the induced back electromagnetic force at the receiver end with PWM in the rising current slope in examples of the present disclosure. The switch driver includes a pulse width modulator being configured to generate only the first PWM control signal, PWM1 of Slop 1. It is only for more successful data transmission.

Figure 8:
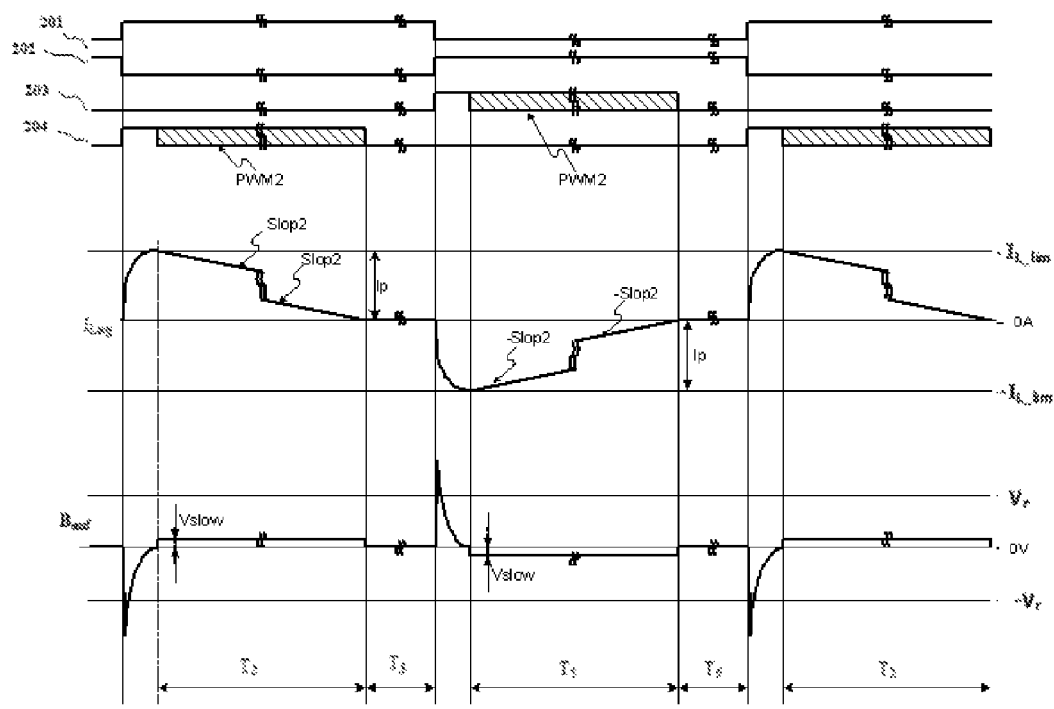
FIG. 8 shows the MST driver's switching operation with the load current waveform and the induced back electromagnetic force at the receiver including PWM in the falling current slope only in examples of the present disclosure.

FIG. 8 shows the MST driver's switching operation with the load current waveform and the induced back electromagnetic force at the receiver end with PWM in the falling current slope in examples of the present disclosure. The switch driver includes a pulse width modulator being configured to generate only the second PWM control signal, PWM2 of Slop 2. It is only for power loss reduction.

Those of ordinary skill in the art may recognize that modifications of the embodiments disclosed herein are possible. For example, time intervals may vary. Other modifications may occur to those of ordinary skill in this art, and all such modifications are deemed to fall within the purview of the present invention, as defined by the claims.

The invention claimed is:

1. A magnetic stripe data transmission (MST) driver configured to transmit magnetic strip data including a stream of pulses, the MST driver comprising:
   a pair of high side switches comprising a first switch and a second switch;
   a pair of low side switches comprising a third switch and a fourth switch; the first, second, third and fourth switches being arranged in a full bridge type configuration connected across a voltage source and a ground;
   an inductive coil connected across outputs of the full bridge type configuration of the switches; and
   a switch driver configured to drive the pair of low side switches and the pair of high side switches so as to control load current slopes of load current rising and falling portions of a load current to generate a back electromagnetic force emulating the magnetic strip data during the load current rising and falling portions through the inductive coil.

2. The MST driver of claim 1, wherein the switch driver is configured to drive the pair of low side switches or the pair of high side switches by selectively and repeatedly switching between ON states and OFF states so as to control the load current to generate a selected rising portion and a selected falling portion through the inductive coil in a forward direction or in a reverse direction with programmable load current rising and falling slopes to generate magnetic signals during the load current rising and falling portions.

3. The MST driver of claim 1, wherein the switch driver generates a first control signal for reliable data transmission and a second control signal for power loss reduction.

4. The MST driver of claim 3, wherein the switch driver is configured to drive the pair of low side switches in a forward direction by setting the first switch in a continuously ON state and by repeatedly switching the fourth switch between an ON state and an OFF state according to the first control signal and then the second control signal.

5. The MST driver of claim 4, wherein the switch driver is configured to repeatedly switch the fourth switch between the ON state and the OFF state according to a duty cycle of the first control signal and a duty cycle of the second control signal;
wherein the duty cycle of the first control signal is adjusted to set the rising portions of the load current in the forward direction not exceeding a predetermined current limit with a positive first slope so as to induce a negative back electromagnetic force generating a signal lower than a negative reference voltage in a receiver to recognize the induced back electromagnetic force corresponding to a low pulse signal; and
wherein the duty cycle of the second control signal is adjusted to set the falling portions of the load current in the forward direction after reaching the predetermined current limit with a second slope having a value less than a value of the positive first slope to induce a positive back electromagnetic force generating another signal lower than a positive reference voltage in the receiver, to reduce the power loss during time periods without signal transmission.

6. The MST driver of claim 3, wherein the switch driver is configured to drive the pair of low side switches in a reverse direction by setting the second switch in a continuously ON state and by repeatedly switching the third switch between an ON state and an OFF state according to the first control signal and then the second control signal.

7. The MST driver of claim 6, wherein the switch driver is configured to repeatedly switch the third switch between the ON state and the OFF state according to a duty cycle of the first control signal and a duty cycle of the second control signal;
wherein the duty cycle of the first control signal is adjusted to set the falling portions of the load current in the reverse direction not exceeding a predetermined current limit with a negative first slope so as to induce a positive back electromagnetic force generating a signal higher than a positive reference voltage in a receiver to recognize the induced back electromagnetic force corresponding to a high pulse signal; and
wherein the duty cycle of the second control signal is adjusted to set the rising portions of the load current in the reverse direction after reaching the predetermined current limit with a positive second slope having an absolute value less than an absolute value of the first slope to induce a negative back electromagnetic force generating another signal higher than a negative reference voltage in the receiver, to reduce the power loss during time periods without signal transmission.

8. A method for driving a magnetic stripe data transmission (MST) driver with low power and with transmission of signals generated by the MST driver, the method comprising the steps of:
providing a pair of high side switches comprising a first switch and a second switch;
providing a pair of low side switches comprising a third switch and a fourth switch; the first, second, third and fourth switches being arranged in a full bridge type configuration connected across a voltage source and a ground;
providing an inductive coil connected across outputs of the full bridge type configuration of the switches;
generating magnetic signals by driving a load current having rising portions and falling portions through the inductive coil in a forward direction or in a reverse direction with programmable load current rising and falling slopes to induce a recognizable back electromagnetic force at a receiver emulating the magnetic strip data during the load current rising and falling portions and to reduce power loss during time periods without signal transmission by controlling the programmable load current rising and falling slopes using pulse width modulation (PWM).

9. The method of claim 8 further comprising the step of providing diodes connected across each of the first, second, third and fourth switches for facilitating free-wheeling of the load current corresponding to stored energy in the inductive coil during OFF periods of the switches.

10. The method of claim 8, wherein the step of generating magnetic signals by driving the load current through the inductive coil with the programmable load current rising and falling slopes includes selectively and repeatedly switching of the pair of low side switches or the pair of high side switches.

11. The method of claim 10, wherein the selectively and repeatedly switching of the pair of low side switches comprises:
setting the first switch in a continuously ON state and repeatedly switching the fourth switch between an ON state and an OFF state for driving the load current in the forward direction with the programmable load current rising and falling slopes; and
setting the second switch in a continuously ON state and repeatedly switching the third switch between an ON state and an OFF state for driving the load current in the reverse direction with the programmable load current rising and falling slopes.

12. The method of claim 10, wherein the selectively and repeatedly switching of the pair of high side switches comprises:
setting the fourth switch in a continuously ON state and repeatedly switching the first switch between an ON state and an OFF state for driving the load current in the forward direction with the programmable load current rising and falling slopes; and
setting the third switch in a continuously ON state and repeatedly switching the second switch between an ON state and an OFF state for driving the load current in the reverse direction with the programmable load current rising and falling slopes.

13. The method of claim 8, wherein the step of generating magnetic signals by driving the load current through the inductive coil in the forward direction with the programmable load current rising and falling slopes includes repeatedly switching the switches between ON and OFF states according to a duty cycle of a first PWM control signal and a duty cycle of a second PWM control signal comprising:
adjusting the duty cycle of the first PWM control signal to set the rising portions of the load current in the forward direction not exceeding a predetermined current limit with a positive first slope so as to induce a negative back electromagnetic force generating a signal lower than a negative reference voltage in a receiver to recognize the induced back electromagnetic force corresponding to a low pulse signal; and
adjusting the duty cycle of the second PWM control signal to set the falling portions of the load current in the forward direction after reaching to the predetermined current limit with a second slope having a value less than a value of the positive first slope to induce a positive back electromagnetic force generating another signal lower than a positive reference voltage in the receiver, to reduce the power loss during the time periods without signal transmission.

14. The method of claim 13, wherein the positive first slope is selectively attained to provide sufficient durations of the load current rising portions to recognize the induced negative back electromagnetic force generated signal in the receiver as the low pulse signal.

15. The method of claim 8, wherein the step of generating magnetic signals by driving the load current through the inductive coil in the reverse direction with the programmable load current rising and falling slopes includes repeatedly switching the switches between ON and OFF states according to a duty cycle of a first PWM control signal and a duty cycle of a second PWM control signal comprising:
adjusting the duty cycle of the first PWM control signal to set the falling portions of the load current in the reverse direction not exceeding a predetermined current limit with a negative first slope so as to induce a positive back electromagnetic force generating a signal higher than a positive reference voltage in a receiver to recognize the induced back electromagnetic force corresponding to a high pulse signal;
adjusting the duty cycle of the second PWM control signal to set the rising portions of the load current in the reverse direction after reaching the predetermined current limit with a positive second slope having an absolute value less than an absolute value of the first slope to induce a negative back electromagnetic force generating another signal higher than a negative reference voltage in the receiver; to reduce the power loss during the time periods without signal transmission.

16. The method of claim 15, wherein the negative first slope is selectively attained to provide sufficient durations of the load current falling portions to recognize the induced positive back electromagnetic force generated signal in the receiver as the high pulse signal.

17. The method of claim 8, wherein an intermediate stage is between the forward direction and the reverse direction and wherein the load current reduces to zero in the intermediate stage for improved power efficiency.

18. The method of claim 8, wherein linearity of the load current rising and falling slopes is controlled by changing a duty cycle of a PWM control signal; wherein for a linear slope, a PWM duty cycle is varied and wherein for a non-linear logarithmic slope, the PWM duty cycle is a constant.

19. The method of claim 8, wherein a PWM switching frequency during the rising and falling portions is larger than an input signal frequency to reduce current ripple in the load current.

20. The method of claim 8 further comprising a pulse frequency modulation method including a constant on-time control and a constant off-time control to control the load current rising and falling slopes.

* * * * *